United States Patent
Zapata

(10) Patent No.: US 10,005,112 B2
(45) Date of Patent: Jun. 26, 2018

(54) METHOD FOR LINING EXISTING ASH BASIN AND LANDFILL SITES

(71) Applicant: Zapata Incorporated, Charlotte, NC (US)

(72) Inventor: Manuel Zapata, Charlotte, NC (US)

(73) Assignee: ZAPATA INCORPORATED, Charlotte, NC (US)

( * ) Notice: Subject to any disclaimer, the term of this patent is extended or adjusted under 35 U.S.C. 154(b) by 140 days.

(21) Appl. No.: 15/336,840

(22) Filed: Oct. 28, 2016

(65) Prior Publication Data

US 2017/0120314 A1    May 4, 2017

Related U.S. Application Data

(60) Provisional application No. 62/249,010, filed on Oct. 30, 2015.

(51) Int. Cl.
*B09B 1/00* (2006.01)
*E02D 31/00* (2006.01)

(52) U.S. Cl.
CPC .............. *B09B 1/00* (2013.01); *B09B 1/004* (2013.01); *B09B 1/008* (2013.01); *E02D 31/004* (2013.01); *E02D 31/006* (2013.01); *B09B 2220/06* (2013.01)

(58) Field of Classification Search
CPC .................. E02D 31/006; B09B 1/00
See application file for complete search history.

(56) References Cited

U.S. PATENT DOCUMENTS

| | | | | |
|---|---|---|---|---|
| 5,201,609 A | * | 4/1993 | Johnson | B09B 1/00 405/129.7 |
| 5,429,454 A | * | 7/1995 | Davis | B09B 1/00 405/129.2 |
| 5,816,748 A | * | 10/1998 | Kleiser | E02D 31/006 405/268 |
| 8,864,412 B2 | * | 10/2014 | Kunz | B09C 1/062 405/128.1 |
| 2006/0008325 A1 | * | 1/2006 | Ianniello | B09B 1/00 405/129.1 |
| 2016/0312428 A1 | * | 10/2016 | Ahlberg | E02D 3/00 |

* cited by examiner

*Primary Examiner* — John J Kreck
(74) *Attorney, Agent, or Firm* — Fox Rothschild LLP; Jeff E. Schwartz

(57) ABSTRACT

A method for lining an existing waste disposal site having a waste level includes, for example: installing perimeter barrier walls about the site and interior barrier walls within the perimeter barrier walls to define cells; transferring waste, such as for example ash, from one of the cells to one or more other cells to form an empty cell with a layer of contaminated material at the bottom of the empty cell; removing the layer of contaminated material from the empty cell to form a clean cell with a noncontaminated bottom layer; installing a barrier liner layer in the clean cell to form a lined cell; and transferring waste from other cells into the lined cell.

16 Claims, 3 Drawing Sheets

METHOD FOR LINING EXISTING ASH BASIN AND LANDFILL SITES

CROSS REFERENCE TO RELATED APPLICATIONS

This application claims priority to U.S. Provisional Application Ser. No. 62/249,010, entitled "Methods for Lining Existing Ash Basin and Landfill Sites" and filed Oct. 30, 2015, which is incorporated herein by reference in its entirety.

TECHNICAL FIELD

This invention relates to an improved method and apparatus for lining current ash basins, waste landfills, hazardous waste dumps, and other similar disposal sites containing waste particulate material. The present invention relates for example to a method and apparatus of providing a moisture impervious barrier suitable for environmental pollution control such that off-site removal of the waste material is not necessarily required.

BACKGROUND OF THE INVENTION

Power plants generate electricity by burning coal in the furnaces of boilers, which are used to generate steam for turbines that turn generators to produce electricity. A byproduct of burning coal is coal ash. During such coal burning operations in the furnaces of boilers, coal ash is produced in two forms. First, there are light particles, known as fly ash, which leave the boiler with the flue gases and are later trapped by precipitators. Secondly, there are heavier particles, called bottom ash, that remain in the boilers' furnace after combustion and are later removed from the furnaces. In general, both fly and bottom ash are referred to as ash. Such ash can contain a number of toxic materials depending on the type of coal being used. For example, the ash may include one or any combination of mercury, molybdenum, selenium, strontium, thallium, arsenic, dioxins, beryllium, boron, cadmium, chromium, hexavalent chromium, cobalt, lead, manganese, vanadium, and polyaromatic hydrocarbons.

This byproduct of generating electricity, coal ash, is normally deposited in large ash basins, or landfills, that are typically a depression in the ground, either naturally occurring or man-made near the power plant itself. When this practice of storing coal ash started, at the dawn of the power industry, there was no concern for the contaminating aspects of coal ash either to the soil itself, or to the groundwater below. Over the course of decades, the accumulation of millions of tons of ash has occurred near power plants throughout the country, in what can be described as unlined disposal sites.

Because power plants require large quantities of cooling water to condense the steam back into water for reuse in a power generation cycle of the power plant, most power plants are located near a river, lake or other body of water. The close proximity of a power plant to a body of water means the water table, in the general area of the power plant, is relatively close to the ground surface. Thus, the close proximity of the power plant to a body of water can result in many of the unlined ash basins to be partially located in the water table. Rainwater, water from the water table itself, and water from power plant operations used in some cases to carry the ash to the ash basin can be mixed in the unlined ash basin to create a thick layer of wet ash covered, in some cases, by many feet of water contaminated with coal ash both in suspension and in diluted forms. The contaminated water can enter into the water table because most ash basins are unlined or have no barrier to prevent the contaminated water or other contaminants from the coal ash from entering into the water table. Further, the contaminated water or other contaminants from the ash can move into an adjacent body of water once in the water table.

As science advanced, and determined the detrimental effects of ash there has been a public outcry, coupled with regulatory requirements, to remedy the situation of ash basins contaminating the groundwater table and adjacent bodies of water. This public outcry has resulted in strong regulatory requirements to clean up such unlined disposal sites to stop the contamination of groundwater Similar situations have also occurred with current waste landfills and current hazardous waste dumps. Many solutions have been attempted to address the challenges presented in cleaning up an unlined disposal site.

One current solution for cleaning up unlined ash basins is the excavation and transportation, by truck or rail, of the ash to a lined landfill in a location away from the power plant where the water table is lower. This solution presents several problems of its own including the need to acquire a large tract of land suitable for a landfill, obtaining the necessary regulatory permits, obtaining the agreement of the neighbors in the area, the large cost of associated with the transportation itself, and the risk of a traffic accident during the transport that will cause a large ash spill contaminating a neighborhood, its soil, and its groundwater.

Another potential solution is the construction of a new lined ash basin at the power plant site itself. The problems with this approach are finding a suitable large amount of space within the boundaries of the power plant itself to build the new landfill, a new disruption of the water table, and the risks and costs associated with moving the large quantities of ash involved. These problems are in addition to obtaining a permit from regulatory bodies to be allowed to build a new landfill within the water table.

There is a proposal to simply cap the ash basin or landfill in place. Capping the ash basin will eliminate the addition of rainwater to the ash basin, which may cause contaminated water to go into the ground water. However, capping does not eliminate the flow of groundwater through the body of the ash basin such that contamination of the groundwater and nearby bodies of water will continue. Further, most regulatory bodies will not accept capping as a solution.

Another proposal is to push the ash from one end of the ash basin over on top of an adjacent area to reach the bottom of the basin so as to expose native soil and allow a liner to be installed. The problem with this solution is that coal ash should be kept wet to keep airborne particulates down when working with the ash. The wet ash can be more like a liquid mud and behave as a slurry such that that the ash will not remain piled up for very long thus creating a never ending process of piling up the ash, while it continues to fall back. The ash should not be allowed to dry too much or airborne particulates may become an issue when working with the ash.

Another possible solution is to stabilize the ash into a less volatile form. One such technique is crystalizing the ashes using an electric discharge like a plasma torch. The problem with this technique is the enormous amounts of energy required to achieve the crystallization state, and then the crystals must be transported, requiring more energy to be spent, to a landfill with sufficient capacity and approved to receive such crystalized ash. Another technique is to use the ash in industrial applications like in cement mixes and for the manufacturing of sheet rock. Unfortunately, while some of these applications are viable, there is not enough demand for the quantities of ash being produced by power plants and there are still handling and transportation issues with the ash.

SUMMARY OF THE INVENTION

Accordingly, embodiments of the invention are directed to an improved method and apparatus for lining disposal sites that substantially obviates one or more of the problems due to limitations and disadvantages of the related art.

An object of embodiments of the invention is to line a waste disposal site without removing waste from the site.

Another object of embodiments of the invention is to provide additional capacity to a waste disposal site.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method for lining an existing waste disposal site having a waste level includes, for example, installing perimeter barrier walls about the site and interior barrier walls within the perimeter barrier walls to define cells; transferring waste such as, for example ash, from one of the cells to one or more other cells to form an empty cell with a layer of contaminated material at the bottom of the empty cell; removing the layer of contaminated material from the empty cell to form a clean cell with a noncontaminated bottom layer; installing a barrier liner layer in the clean cell to form a lined cell; and transferring waste from other cells into the lined cell.

It is to be understood that both the foregoing general description and the following detailed description are exemplary and explanatory and are intended to provide further

BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated, enlarged, exploded, or incomplete to facilitate an understanding of the invention.

DETAILED DESCRIPTION OF EMBODIMENTS OF THE INVENTION

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

Figure 1:
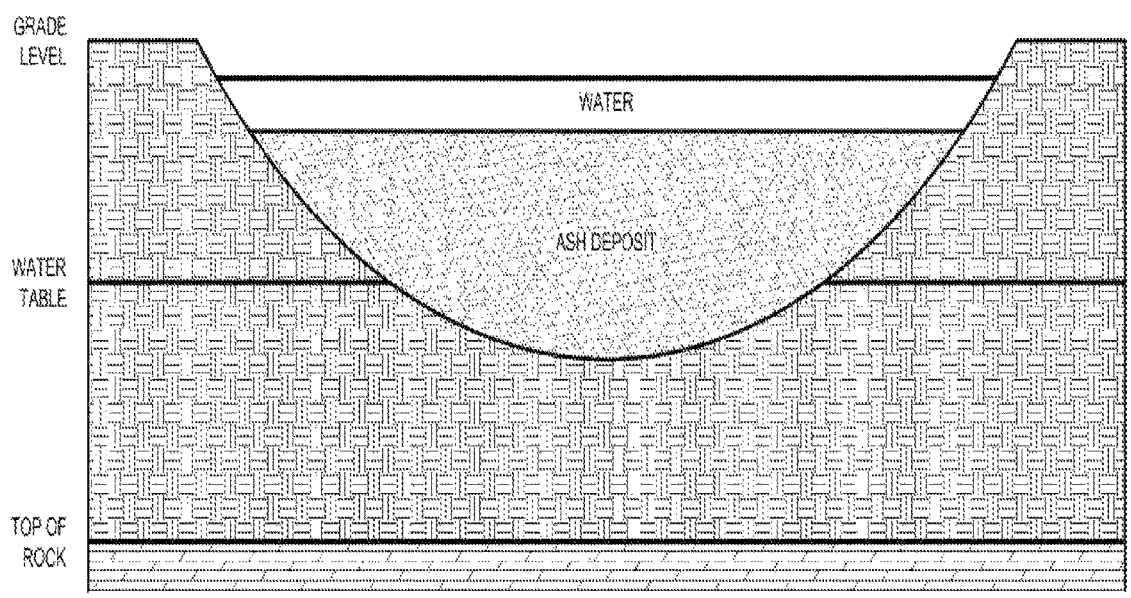
FIG. 1 is a cross sectional representation of a typical landfill showing the water on top, the ash deposits, the intersection of the water table, and the top of bedrock below the surface of the soil.
Figure 2:
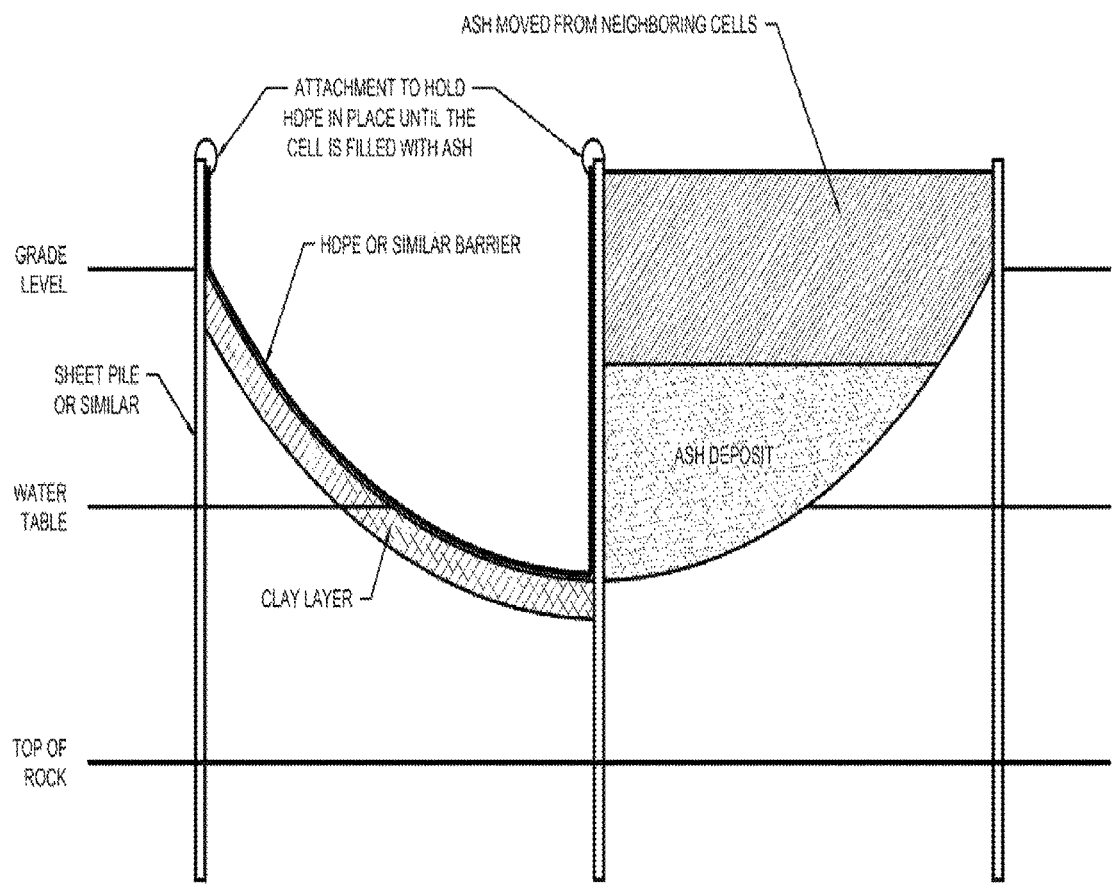
FIG. 2 is a cross sectional view of an embodiment showing the ash already transferred from a donor cell to a neighboring recipient cell, or cells, and the donor cell lined with a clay layer and a liner covering both the bottom and the walls of the cell.

The method presented in this patent application provides, for example, a solution by devising a way to install a liner in-situ without having to move the waste, such as for example ash, to another location, and without additional disturbances to the water table. FIG. 1 is a cross sectional representation of a typical landfill showing the water on top, the ash deposits, the intersection of the water table, and the top of bedrock below the surface of the soil. The method uses engineering and construction tools along with new techniques to create a new methodology for installing a liner in an existing landfill, ash basin, such as shown in FIG. 1, or other types of unlined disposal sites containing waste particulate material such as hazardous waste dumps. FIG. 2 is a cross sectional view of an embodiment showing the ash already transferred from a donor cell to a neighboring recipient cell, or cells, and the donor cell lined with a clay layer and a liner covering both the bottom and the walls of the cell. For example, an embodiment of the invention can be implemented using the following steps.

A. Using geophysics, or other means, to prepare a three dimensional map of the entire ash basin or entire waste disposal site, calculate the volume of ash or other waste present throughout the site and prepare a construction plan to devise how the basin or site will be sectioned into cells.

B. Removing water, if any, standing freely over the ash or other waste. Further, the removed water can be treated to be suitable for discharge to a river, creek, or lake in compliance with State and Federal requirements.

C. Dividing the basin or site into cells by installing a barrier system having inner walls and perimeter walls. The perimeter walls of the barrier system can have a height higher than the initial level of ash or waste in the site to accommodate additional ash or waste. Both the perimeter walls and the inner walls of the barrier system can have a height higher than the initial level of ash or waste in the site to accommodate additional ash or waste being deposited into each cell.

D. Transferring ash or waste from one of the cells to one or more other cells so as to remove ash or waste from a cell to form an empty cell with barrier walls and a bottom of soil. Such a transfer can occur using a crawler crane, a solids pump or a conveyor type device.

E. Removing a layer of contaminated soil from the bottom of the empty cell that was under the transferred ash or waste to form a clean cell.

F. Installing a barrier material layer, such as clay, on the bottom of the clean cell. The barrier material layer should be of sufficient depth to comply with regulatory requirements.

G. Installing a barrier liner layer, such as High Density Polyethelyene or a similar polymer material acceptable to regulators, on the barrier material layer at the bottom of the clean cell and on the walls of the clean cell to form a lined cell. The barrier liner can cover the bottom of the clean cell and the walls of the clean cell up to the top of the walls to form a fully lined bowl in the clean cell.

H. Transferring ash or waste into the lined cell from one or more other cells.

I. Repeating for other cells at the site the sequence of transferring ash or waste to form an empty cell, removing a layer of contaminated soil to form a clean cell, installing barrier material layer, install a barrier liner layer to form lined cell and transferring ash or other waste into a lined cell.

J. Capping the site if the site will no longer be receiving ash or other waste for disposal.

Ash basins, which are a type of waste disposal site, are typically large impoundments with a lengthy perimeter and large dimensions of width and length. To divide an ash basin into cells, perimeter barrier walls, such as sheet pile walls, can, for example, be installed along the perimeter of the basin and also interior barrier walls can be installed inside the basin within the perimeter barrier walls along the width and length of the basin. The perimeter barrier walls can be installed with relative ease compared to the interior barrier walls. That is, the perimeter barrier walls can be installed with construction equipment on relatively solid ground, while installation of the interior barrier walls may have to be done with construction equipment atop ash or other waste. The installation of a barrier wall in any terrain can include an engineering analysis to design and construct a barrier wall to ensure worker safety and the stability of the barrier walls. Interlocking sheet pilings or vertical pilings used in conjunction with panels driven between the vertical pilings can be used as the barrier walls. An engineering analysis of a barrier wall can start with a detailed geotechnical study of the soil that will anchor the barrier wall, the type of ash or waste, the depth of the ash or waste and other loading characteristics of the ash or waste. The results of such a study should determine the type of pile to be driven, the depth to which the pile is driven, the length of the pile and the need, if any, to provide cross-bracing between the piles or other means of lateral support.

During the initial installation of the interior barrier walls through the ash or other waste, the interior barrier walls will, in certain embodiments, be loaded equally on both sides; but, after the transfer of ash or other waste from one cell to other cells, the interior barrier walls of an empty cell can become loaded only on one side. This is an asymmetrical load condition created by the lateral loads exerted by the ash or other waste and the water on the loaded side of the barrier wall as well as added forces generated by the wind, the ice in the winter, earthquakes, and possible equipment collisions during operations. These forces should be taken into account to determine the configuration of the interior barrier wall in terms of thickness corrugation and anchoring depth. Calculations for these forces can provide information to prepare a construction plan and the configuration of the interior barrier wall.

Figure 3:
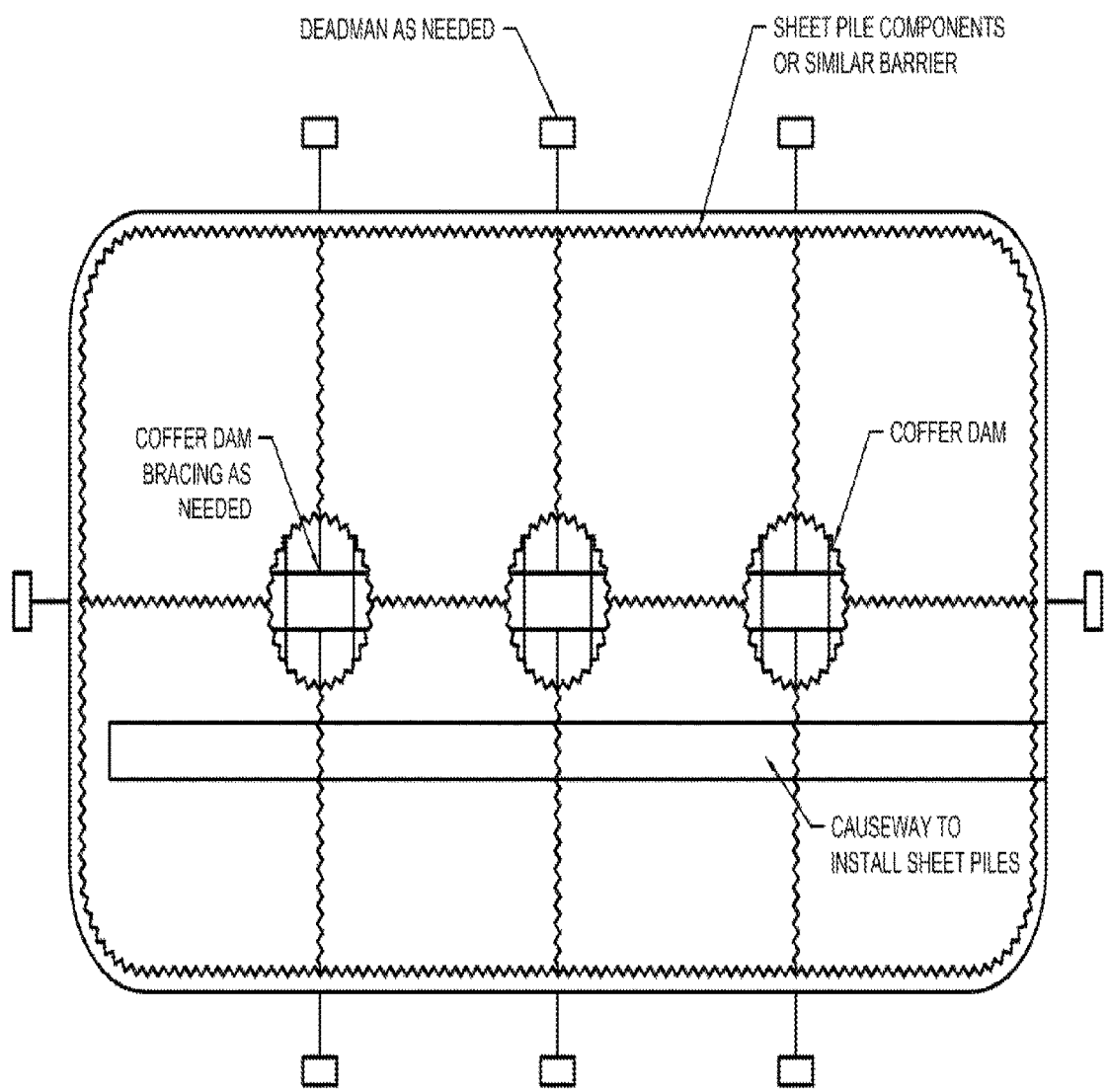
FIG. 3 is a plan view of a landfill showing it divided, only for illustration purposes, into eight cells using sheet pile components, coffer dams or similar barrier and support systems.

To provide stability to the asymmetrically loaded interior barrier walls, cofferdams dams may be installed along the length of the interior barrier walls, as shown in FIG. 3. These cofferdams can be constructed of the same barrier material as the interior barrier walls themselves. The need to install cofferdams can be determined in each case depending on the soil conditions, identified by the geotechnical analysis of the soil beneath the ash basin or waste disposal site, and the length of the interior barrier walls. The design of the cofferdams can be similar to the design of the barrier walls themselves, but the cofferdam can be braced internally to provide additional stability. After the cofferdam is built, and excavation of the ash in the cofferdam begins using a crawler crane, bracing elements will, for example, be installed inside the cofferdam to provide additional stability to the cofferdam itself and to the barrier walls connected to the cofferdam.

Perimeter barrier walls can be stabilized using a "dead man" to anchor the wall back to solid ground, as shown in FIG. 3. The distance between these anchors can be determined by the soils conditions on the perimeter and the depth of the ash basin or waste disposal site itself. Installing the sheet pile wall around the perimeter of the ash basin or waste disposal site can be done using a vibratory pile driver mounted on a crawler crane, using guides and templates to align the piles along the wall as well as how the site will be sectioned into cells.

As shown in FIG. 3, the installation of interior barrier walls, needed to divide the basin into several cells, may require the construction of one or more causeways to allow construction equipment, such as a crawler crane with a pile driver attachment, to move over the ash or other waste. The dimensions of the causeway can be designed based on the pressure exerted on the floor of the causeway by the construction equipment, such as a crawler crane, when installing a pile for a barrier wall. The design of the causeway can be to allow transferring of the pressure to a geogrid on the ash or other waste such that the causeway spreads the load over a large area of ash or other waste. Geogrids are made of metal, or reinforced fiberglass, and are used in construction over soft terrains. Details of using the causeway, such as the type and number of layers of geogrid to be used, and the additional use of gravel or rip rap cover the geogrid will vary depending on the moisture content of the ash or other waste and the type of ash or waste itself. Other types of causeways, such as timber section or a float bridge, can alternatively be used. As the construction equipment, such as a crawler crane, moves around the ash basin or waste disposal site, and completes the work for a given cell, the causeway can be removed and installed in another part of the ash basin or waste disposal site until each of the cells of entire basin are lined and filled with ash or other waste that came from an unlined portion of the ash basin or waste disposal site. Additional ash or other waste may be added to the basin since the barrier walls are higher than the original level of ash or other waste in the ash basin or waste disposal site.

The barrier liner layer can be installed so that it hangs from the top of the barrier walls to allow the barrier liner layer adjust itself to the barrier walls as ash or other waste is reintroduced into a lined cell. As, shown in FIG. 2, the barrier liner can be temporarily clipped at the top of the barrier walls. The barrier liner layer can provide a moisture impervious s barrier suitable for controlling environmental pollution by preventing ground water from entering a lined cell and preventing contaminated water from exiting a lined cell. The barrier liner layer for certain embodiments should not be attached to the barrier walls since the barrier liner layer should be free to move during the loading of ash or other waste into a lined cell and be able to move during changes in temperature or during earthquake activity. An unattached barrier liner layer can enable a freedom of movement that will prevent the liner from rupturing and negating its isolating qualities.

What is claimed is:
1. A method for lining an existing waste disposal site having a waste level, comprising:
    installing perimeter barrier walls about the site and interior barrier walls within the perimeter barrier walls to define cells;

transferring waste from one of the cells to one or more other cells to form an empty cell with a layer of contaminated material at the bottom of the empty cell;

removing the layer of contaminated material from the empty cell to form a clean cell with a noncontaminated bottom layer;

installing a barrier liner layer in the clean cell to form a lined cell; and transferring waste from other cells into the lined cell.

2. The method for lining an existing waste disposal site according to claim 1, further comprising:

removing standing water from one of the cells prior to transferring waste from one of the cells to one or more other cells.

3. The method for lining an existing waste disposal site according to claim 1, further comprising:

installing a barrier material layer on the noncontaminated bottom layer in the clean cell, wherein the barrier liner layer is installed on the barrier material layer.

4. The method for lining an existing waste disposal site according to claim 2, wherein the barrier material layer is clay.

5. The method for lining an existing waste disposal site according to claim 1, further comprising covering the bottom of the empty cell with the barrier liner layer.

6. The method for lining an existing waste disposal site according to claim 1, further comprising covering the bottom of the clean cell and up to the top of the barrier walls with the barrier liner layer to form a fully lined cell.

7. The method for lining an existing waste disposal site according to claim 6, further comprising attaching the barrier liner layer to the top of the barrier walls.

8. The method for lining an existing waste disposal site according to claim 6, further comprising detaching the barrier liner layer from the barrier walls.

9. The method for lining an existing waste disposal site according to claim 1, wherein the barrier liner layer is a polymer.

10. The method for lining an existing waste disposal site according to claim 4, wherein the barrier liner layer is high density polyethelyne.

11. The method for lining an existing waste disposal site according to claim 1, wherein the perimeter barrier walls have a height higher than the waste level to accommodate additional waste.

12. The method for lining an existing waste disposal site according to claim 1, wherein the interior barrier walls have a height higher than the waste level to accommodate additional waste.

13. The method for lining an existing waste disposal site according to claim 1, wherein the transferring of waste from one of the cells to one or more other cells to form an empty cell is done using at least one of a crawler crane, a solids pump, or a conveyor type device.

14. The method for lining an existing waste disposal site according to claim 1, further comprising:

repeating for other cells at the site the sequence of transferring waste to form an empty cell, removing the layer of contaminated soil to form a clean cell, installing a barrier liner layer to form a lined cell and transferring waste into the lined cell.

15. The method for lining an existing waste disposal site according to claim 1, wherein the waste further comprises ash.

16. The method for lining an existing waste disposal site according to claim 1, further comprising:

capping the site.

* * * * *